United States Patent
Honda

(10) Patent No.: US 9,835,159 B2
(45) Date of Patent: Dec. 5, 2017

(54) FUEL PUMP HAVING PULSATION DAMPENING BRANCH FLOW PATHS

(71) Applicant: AISAN KOGYO KABUSHIKI KAISHA, Aichi-ken (JP)

(72) Inventor: Yoshihiko Honda, Aichi-ken (JP)

(73) Assignee: AISAN KOGYO KABUSHIKI KAISHA, Obu-Shi, Aichi-ken (JP)

( * ) Notice: Subject to any disclaimer, the term of this patent is extended or adjusted under 35 U.S.C. 154(b) by 476 days.

(21) Appl. No.: 13/944,810

(22) Filed: Jul. 17, 2013

(65) Prior Publication Data

US 2014/0030119 A1 Jan. 30, 2014

(30) Foreign Application Priority Data

Jul. 26, 2012 (JP) ................................ 2012-165448

(51) Int. Cl.
*F04D 13/06* (2006.01)
*F04D 29/40* (2006.01)
(Continued)

(52) U.S. Cl.
CPC ........... *F04D 13/06* (2013.01); *F02M 37/045* (2013.01); *F02M 37/08* (2013.01); *F02M 59/12* (2013.01);
(Continued)

(58) Field of Classification Search
CPC .. F02M 37/045; F02M 37/08; F02M 37/0041; F02M 59/12; F02M 37/0029;
(Continued)

(56) References Cited

U.S. PATENT DOCUMENTS 4,569,637 A * 2/1986 Tuckey ................. F02M 37/08
417/360
4,591,311 A * 5/1986 Matsuda ................ F04D 5/002
415/55.5
(Continued)

FOREIGN PATENT DOCUMENTS

JP S6283223 4/1987
JP S6283223 A 4/1987
(Continued)

OTHER PUBLICATIONS

English Translation of Abstract of Japanese Patent Application No. JP 2012031808.*

(Continued)

*Primary Examiner* — Bryan Lettman
*Assistant Examiner* — Timothy Solak
(74) *Attorney, Agent, or Firm* — Vierra Magen Marcus LLP

(57) ABSTRACT

A fuel pump includes a housing, a pump section disposed within the housing on a first side thereof, a motor section disposed within the housing on a second side thereof and communicating with the pump section, and an upper body closing an end of the housing on the second side. A fuel chamber, into which fuel flows from the pump section through the motor section toward the second side of the housing, and a first branch fuel path, which is connected to the fuel chamber, are provided between the upper body and a motor. A discharge port is connected to the fuel chamber. A supply port is connected to the first branch fuel path, and the fuel in the fuel chamber is provided to the supply port through the first branch fuel path.

9 Claims, 9 Drawing Sheets

(51) Int. Cl.
*F04D 29/66* (2006.01)
*F02M 37/08* (2006.01)
*F02M 59/12* (2006.01)
*F02M 37/04* (2006.01)
*F02M 37/00* (2006.01)

(52) U.S. Cl.
CPC ......... *F04D 29/406* (2013.01); *F04D 29/669* (2013.01); *F02M 37/0041* (2013.01)

(58) Field of Classification Search
CPC ....... F02M 37/025; F04D 13/02; F04D 13/06; F04D 13/0653; F04D 13/086; F04D 29/406; F04D 29/42; F04D 29/426; F04D 29/4293; F04D 29/667; F04D 29/668; F04D 29/669; F04D 1/04; F04D 3/005; F04D 13/0666; F04D 25/0686; F04D 25/0653; F04D 15/02; F04D 15/0209; F04D 15/0245; F04D 29/58; F04D 29/5806; F04D 29/586; F04D 29/588; F04D 1/00
See application file for complete search history.

(56) References Cited

U.S. PATENT DOCUMENTS

| | | | | |
|---|---|---|---|---|
| 4,694,857 A * | 9/1987 | Harris | ................. | F02M 37/106 137/565.24 |
| 4,844,621 A * | 7/1989 | Umemura | ............ | F02M 37/048 415/119 |
| 5,039,284 A * | 8/1991 | Talaski | .................. | F02M 37/08 123/516 |
| 2005/0045159 A1 * | 3/2005 | Honda | ................. | B60K 15/077 123/509 |
| 2007/0086905 A1 * | 4/2007 | Nagata | ................. | F02M 37/048 417/423.3 |
| 2012/0027629 A1 * | 2/2012 | Tanahashi | ............... | F04D 5/002 417/410.1 |

FOREIGN PATENT DOCUMENTS

| | | |
|---|---|---|
| JP | S6283224 | 4/1987 |
| JP | H04-21752 U | 2/1992 |
| JP | H05180172 | 7/1993 |
| JP | 2007-288985 A | 11/2007 |
| JP | 2012-031807 | 2/2012 |
| JP | 2012031808 | 2/2012 |

OTHER PUBLICATIONS

English Translation of Abstract of Japanese Patent Application No. JP S6283223.
English Translation of Abstract of Japanese Patent Application No. JP S6283224.
English Translation of Abstract of Japanese Patent Application No. JP H05180172.
Machine Translation of Japanese Patent Application No. JP H05180172 prepared by the Japanese Patent Office.
English Translation of Abstract of Japanese Patent Application No. JP 2012-031807.
Machine Translation of Japanese Patent Application No. JP 2012-031807 prepared by the Japanese Patent Office.
Family List of Japanese Patent Application No. JP 2012031808.
Machine Translation of Japanese Patent Application No. JP 2012031808 prepared by the Japanese Patent Office.
Office Action dated Dec. 1, 2015 in Japanese Patent Application No. 2012-0165448.

* cited by examiner

FUEL PUMP HAVING PULSATION DAMPENING BRANCH FLOW PATHS

CROSS-REFERENCE TO RELATED APPLICATION

This application claims priority to Japanese Patent Application No. 2012-165448 filed on Jul. 26, 2012, the contents of which are hereby incorporated by reference into the present application.

TECHNICAL FIELD

The present teachings relate to a fuel pump including a pump section and a motor section.

DESCRIPTION OF RELATED ART

A jet pump utilizing a part of fuel supplied by a fuel pump may be used to transfer the fuel. In such a case, a branch fuel path is provided on a fuel path through which the fuel discharged from the fuel pump flows, and the jet pump is connected to the branch fuel path. In such a configuration, the branch fuel path needs to be provided on the fuel path extending from the fuel pump, complicating piping. Thus, a technique has been proposed in which the fuel pump includes a discharge port and a supply port through which the fuel is fed to the jet pump (for example, Japanese Patent Application Publication No. S62-83223 and Japanese Patent Application Publication No. S62-83224).

BRIEF SUMMARY OF INVENTION

If the discharge port and an outlet port such as the supply port are provided on the fuel pump, when pressure pulsation occurs in the fuel fed through one of the discharge port and the outlet port, pressure pulsation may also occur in the fuel fed though the other of the discharge port and the outlet port. For example, when the pressure pulsation caused by the fuel fed through the supply port induces pressure pulsation in the fuel fed through the discharge port, fuel piping may vibrate to generate noise or the flow rate of fuel supplied to an apparatus using the fuel (for example, an engine) may change.

It is an object of the present teachings to provide a technique which is used for a fuel pump including a discharge port and an outlet port such as a supply port to allow suppression of possible pressure pulsation in fuel fed through one of the discharge port and the outlet port even if pressure pulsation occurs in fuel fed thorough the other of the discharge port and the outlet port.

A fluid pump disclosed herein may include a housing, a pump section disposed within the housing on a first side of the housing, a motor section disposed within the housing on a second side of the housing and communicating with the pump section, and an upper body closing an end of the housing on the second side. An inlet port communicating with the pump section may be provided on the first side of the housing. The upper body may include a discharge port communicating with the motor section and an outlet port communicating with the motor section to allow fuel to flow out from the motor section to an exterior. The motor section may include a motor configured to drive the pump section. A fuel chamber, into which fuel flows from the pump section through the motor section by flowing toward the second side of the housing, and a first branch fuel path, which is connected to the fuel chamber, may be provided between the upper body and the motor. The discharge port may be connected to the fuel chamber, and the fuel in the fuel chamber may be directly provided to the discharge port without flowing through the first branch fuel path. The outlet port may be connected to the first branch fuel path, and the fuel in the fuel chamber may be provided to the outlet port by flowing through the first branch fuel path.

In this fuel pump, the fuel chamber and the first branch fuel path are provided between the upper body and the motor. The fuel in the fuel chamber is provided to the discharge port without flowing through the first branch fuel path. The fuel in the fuel chamber is provided to the outlet port by flowing through the first branch fuel path. The discharge port and the outlet port are not open to the same space, and thus, even if pressure pulsation occurs in the fuel fed through one of the discharge port and the outlet port, possible pulse pulsation in the fuel fed through the other of discharge port and the outlet port can be suppressed.

DETAILED DESCRIPTION OF INVENTION

Figure 1:
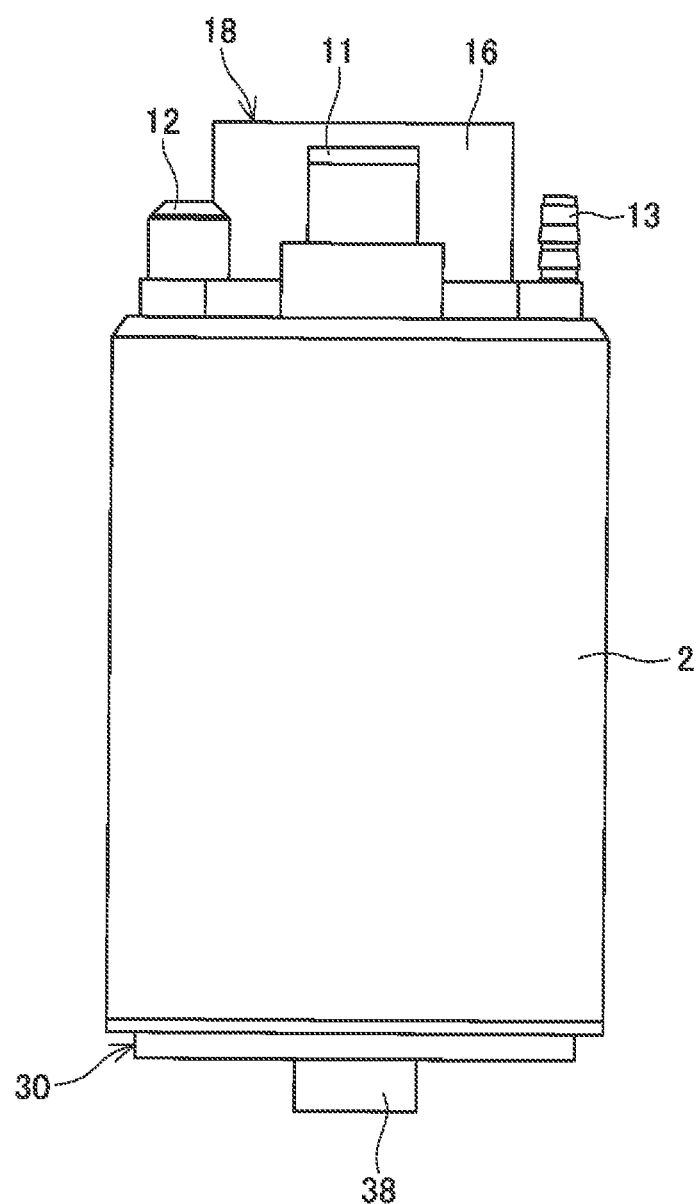
FIG. 1 is a front view of a fuel pump.

In one aspect of the present teachings, a first branch fuel path may extend in a first direction from a fuel chamber, and fuel from the fuel chamber to the discharge port may flow in a second direction which is not parallel to the first direction. Such a configuration suppresses a disturbance in a flow of fuel from the fuel chamber to the discharge port, allowing the fuel to be smoothly discharged through the discharge port.

In another aspect of the present teachings, one end of the first branch fuel path may be connected to the fuel chamber, the first branch fuel path may have a reduction portion of which cross sectional area is smaller than that of the remaining portion of the first branch fuel path, and the reduction portion may be disposed between the one end of the first branch fuel path and an opening portion opened to the outlet port. Such a configuration can effectively restrain pressure pulsation in the fuel fed through one of the discharge port and the outlet port from affecting the flow of the fuel fed through the other of the discharge port and the outlet port.

In another aspect of the present teachings, the outlet port is a supply port configured to supply a jet pump with the fuel. Fuel always flows out from the supply port and is likely to be subjected to pressure pulsation. Thus, applying the technique disclosed herein to the supply port allows effective suppression of possible pressure pulsation in the fuel discharged through the discharge port.

In another aspect of the present teachings, the upper body may further include a relief port communicating with a motor section. A relief valve may be provided at the relief port, and the relief valve may be configured to open the relief port when the pressure of the fuel from a pump section exceeds a predetermined value. A second branch fuel path connected to the fuel chamber may further be provided between the upper body and the motor. The relief port may be connected to the second branch fuel path, and the fuel in the fuel chamber may be provided to the relief port by flowing through the second branch fuel path. Such a configuration can effectively restrain pressure pulsation in the fuel fed through the relief port from affecting the fuel fed through the outlet port or the like.

In another aspect of the present teachings, in a planar view of the upper body, the supply port may be disposed on one side of a reference line, the relief port may be disposed on the other side of the reference line, and the reference line may be a line connecting an axial line of the motor section and the discharge port. In such a configuration, the supply port and the relief port are arranged in a distributed manner, thus allowing the flow of the fuel in the fuel pump to be restrained from being biased.

In another aspect of the present teachings, the motor may include a rotor, and a stator disposed along an outer circumference surface of the rotor. Formation of a fuel path between the housing and an outer circumference surface of the stator may be avoided, and a fuel path may be provided between the rotor and the stator to supply the fuel from the pump section to the fuel chamber. In such a configuration, the fuel is fed to the first branch fuel path only from the fuel chamber side. This allows the fuel to flow out smoothly through the supply port.

Representative, non-limiting examples of the present teachings will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved fuel pumps.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment 1

A fuel pump 10 according to the present embodiment is disposed in a fuel tank (not shown in the drawings) to supply fuel (for example, gasoline) to an engine (not shown in the drawings) of a car. As shown in FIG. 1, the fuel pump 10 includes a cylindrical housing 2 with open opposite ends. An upper end of the housing 2 is closed by an upper body 18. A lower end of the housing 2 is closed by the pump section 30.

Figure 2:
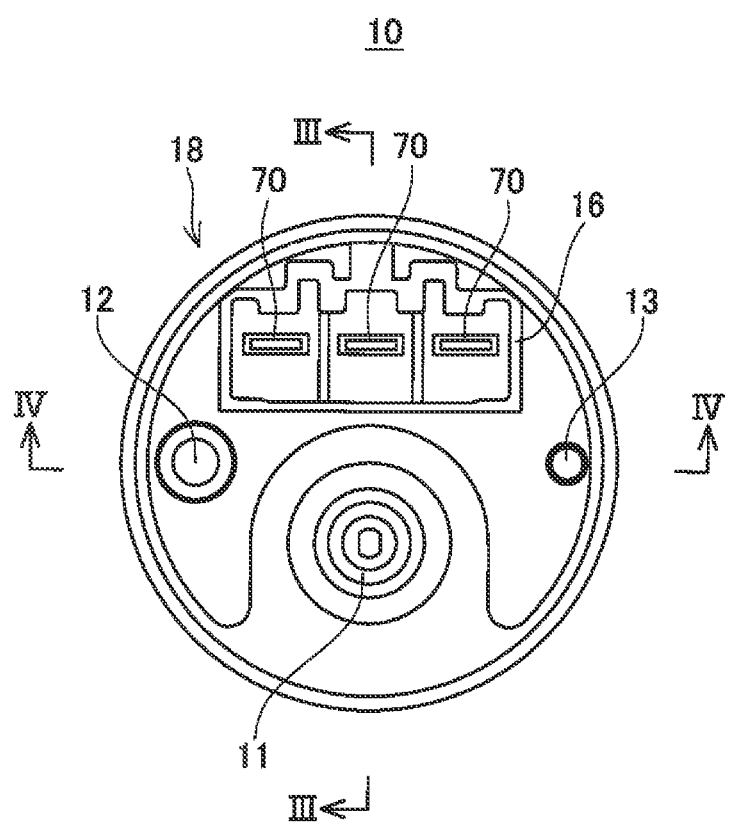
FIG. 2 is a plan view of the fuel pump.

As shown in FIGS. 1 and 2, the upper body 18 includes a discharge port 11, a relief port 12, a supply port 13, and a terminal insertion port 16. An upper side and a lower side as referred to herein are defined based on FIG. 1. Thus, for example, the discharge port 11 is positioned at an upper end of the fuel pump 10. The discharge port 11 is connected to the engine by a fuel supply path (not shown in the drawings). A relief valve (not shown in the drawings) is disposed at the relief port 12. When pressure of the fuel in the fuel pump 10 exceeds a predetermined value, the relief valve opens to discharge the fuel in the fuel pump 10 to an exterior through the relief port 12. Thus, the pressure in the fuel pump 10 is maintained at a predetermined value. The supply port 13 supplies a jet pump (not shown in the drawings) with the fuel. A terminal 70 is disposed in the terminal insertion port 16. One end (connector) of a wire (not shown in the drawings) with the other end thereof connected to an external power source (not shown in the drawings) is inserted into the terminal insertion port 16. Insertion of the wire into the terminal insertion port 16 allows the terminal 70 to be connected to an external power source.

As shown in FIG. 2, in a planar view of the upper body 18 (that is, when the upper body 18 is viewed from infinity in an axial direction of the fuel pump 10), the relief port 12 and the supply port 13 are arranged line-symmetrically with respect to a reference line connecting an axial line of the fuel pump 10 and the discharge port 11 together. That is, the supply port 13 is positioned on one side of the reference line connecting the axial line of the fuel pump 10 and the discharge port 11 together, whereas the relief port 12 is positioned on the other side of the reference line.

Figure 3:
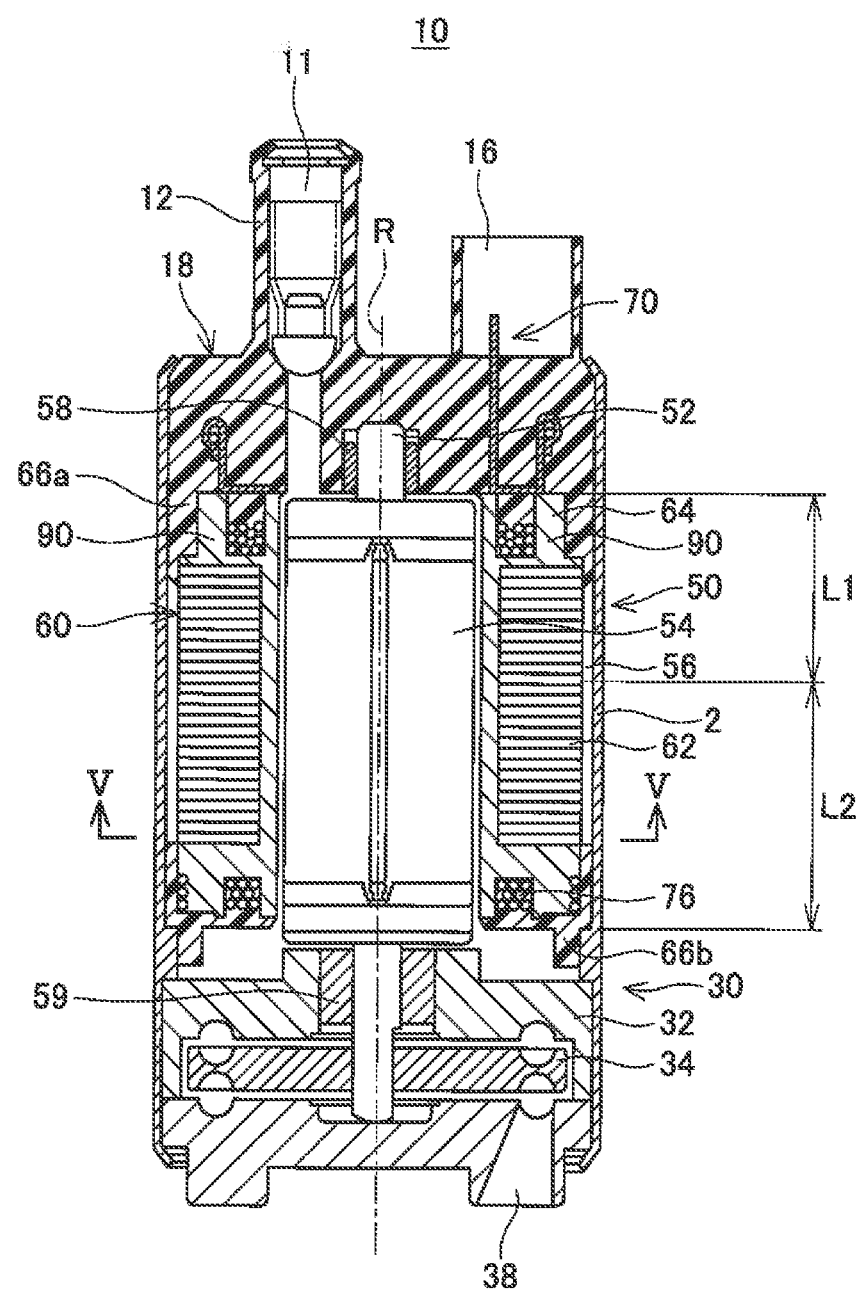
FIG. 3 is a cross-sectional view taken along line III-III in FIG. 2.

As shown in FIG. 3, the fuel pump 10 includes a motor section 50 and a pump section 30. The motor section 50 is disposed at an inner upper end side of the housing 2, and the pump section 30 is disposed at an inner lower end side of the housing 2. The pump section 30 includes a casing 32 and an impeller 34. The casing 32 closes an opening at the lower end of the housing 2. An inlet port 38 is provided at the lower end of the casing 32. The inlet port 38 allows an exterior of the casing 32 and an interior of the casing 32 (that is, a space in which the impeller 34 is accommodated) to communicate with each other. A communication hole (not shown in the drawings) allowing the interior of the casing 32 and the motor section 50 to communicate with each other is formed at the upper end of the casing 32. The impeller 34 is accommodated in the casing 32.

The motor section 50 is positioned above the pump section 30. The motor section 50 is a three-phase brushless motor. The motor section 50 includes a rotor 54 and a stator 60. According to the present embodiment, a resin layer 66a of the stator 60 and the upper body 18 are integrated together. The rotor 54 includes a permanent magnet. A shaft 52 fixedly penetrates the center of the rotor 54. A lower end of the shaft 52 is inserted through a central portion of the impeller 34 in a penetrating manner. The rotor 54 is supported by bearings 58 and 59 disposed at the respective opposite ends of the shaft 52 so as to be rotatable around an axis of rotation R.

Figure 5:
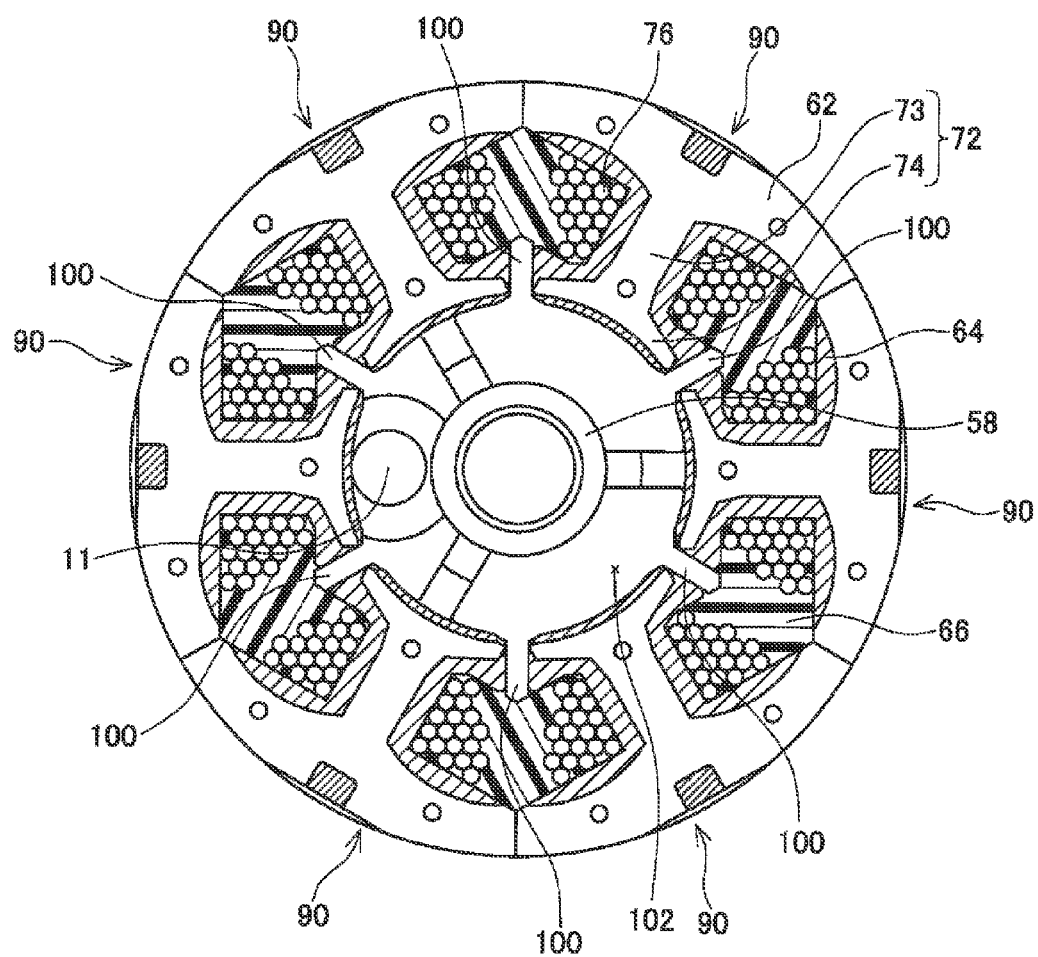
FIG. 5 is a cross-sectional view taken along line V-V in FIG. 3 (a rotor is not illustrated).

As shown in FIGS. 2, 3 and 5, the stator 60 includes six cores 90, three terminals 70, and a resin layer 66. The six cores 90 are annularly arranged so as to form a substantial cylinder. The rotor 54 is disposed in a central portion of the six cores 90 (see FIG. 3). The six cores 90 include two U-phase cores 90, two V-phase cores 90, and two W-phase cores 90. Each of the cores 90 includes a plurality of stacked core plates 62 and an insulating material 64 formed of resin. The core plates 62 are formed of a magnetic substance material. The insulating material 64 covers the surface of each of the plurality of core plates 62 except for an outer circumference surface of the core plate 62.

Each of the cores 90 includes a tooth 72. The tooth 72 extends from an outer circumference edge of the core 90 toward an inner circumference of the stator 60. The tooth 72 includes a tooth main body 73 and a leading end portion 74. The tooth main body 73 extends from an outer circumference edge of a substantial cylinder shape formed by the plurality of cores 90 toward an axis thereof. A coil wire 76 is wound around the tooth main body 73. The coil wire 76 is connected to the terminal 70. The resin layer 66 is filled between the tooth 72 and coil wire 76 of each core 90 and the tooth 72 and coil wire 76 of the adjacent core 90. The tooth leading end portion 74 is connected to an inner circumference side end of the tooth main body 73. The tooth leading end portion 74 extends along an outer circumference of the rotor 54 and lies opposite the outer circumference surface of the rotor 54. A surface of the tooth leading end portion 74 which is opposite to the outer circumference surface of the rotor 54 is covered with the insulating material 64.

A fuel path 100 is provided between the tooth 72 of each core 90 and the tooth 72 of the adjacent core 90. The fuel path 100 is formed of the insulating material 64, covering the tooth 72, and the resin layer 66, filled between the tooth 72 (and coil wire 76 of each core 90) and the adjacent tooth 72 (and coil wire 76 of the adjacent core 90). The fuel path 100 extends from a pump section 30 side end (that is, a lower end) of the stator 60 beyond an upper end of the rotor 54. The fuel path 100 allows a fuel chamber 102 described below and the pump section 30 to communicate with each other. The fuel path 100 extends along a direction of an axis R like a groove. The fuel path 100 is open into the gap between the rotor 54 and the stator 60 as viewed in a cross section orthogonal to the direction of the axis R. That is, the fuel path 100 is in communication with a gap between the rotor 54 and the stator 60 over an entire length of the fuel path 100.

Figure 4:
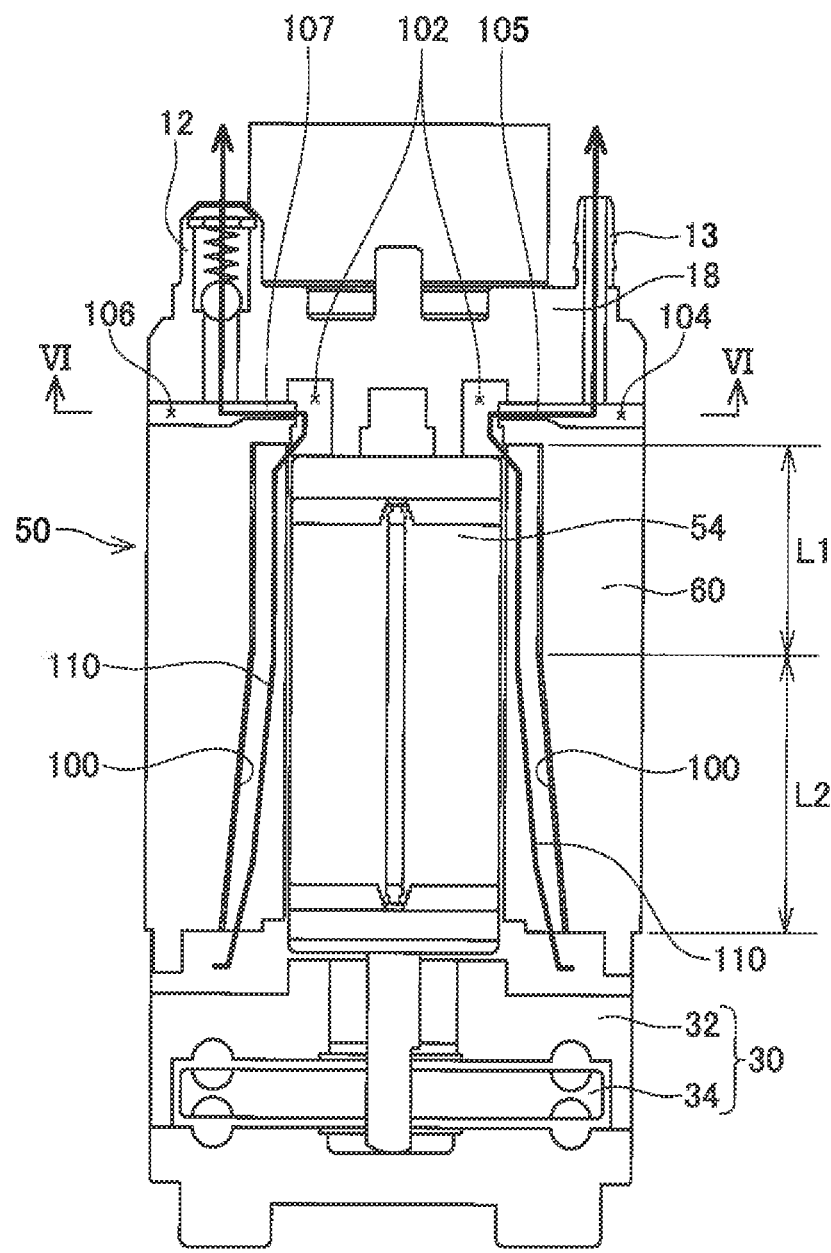
FIG. 4 is a cross-sectional view taken along line IV-IV in FIG. 2 and showing how fuel flows.

As shown in FIG. 4, the fuel path 100 includes a constant section L1 and an enlarged section L2. The constant section L1 is a section from an upper end of the fuel path 100 to an intermediate position of the fuel path 100 in the direction of the axis R. In the constant section L1, the fuel path 100 has a constant area (the area of the fuel path 100 in the cross section thereof which is orthogonal to the direction of the axis R). The enlarged section L2 is a section from a lower end of the constant section L1 (that is, the intermediate position of the fuel path 100 in the direction of the axis R) to the pump section 30 side end of the fuel path 100 (that is, a lower end of the fuel path 100). In the enlarged section L2, the area of the fuel path 100 increases from the lower end of the constant section L1 (that is, the discharge port 11 side) toward the pump section 30 side end of the fuel path 100.

On the other hand, an outer circumference surface of the stator 60 abuts against an inner circumference surface of the housing 2, with no gap formed between the outer circumference surface of the stator 60 and the inner circumference surface of the housing 2. Thus, fuel flowing from the pump section 30 to the motor section 50 does not flow on the outer circumference surface side of the stator 60 but flows only through the gap between the rotor 54 and the stator 60 and through the fuel path 100 before entering the fuel chamber 102.

As shown in FIG. 3, a pump section 30 side end (that is, a lower end) and a discharge port 11 side end (that is, an upper end) of the stator 60 are covered with the resin layer 66. The resin layer 66a, covering the upper end of the stator 60, and a resin layer 66b covering the lower end of the stator 60 are connected together by the resin layer 66 filled between the adjacent teeth 72. The resin layer 66 does not cover an outer circumference surface of the core plate 62. That is, the outer circumference surface of the core plate 62 is exposed. The resin layer 66 is molded by a forming die. The six cores 90 covered with the insulating material 64 are placed in the forming die. Each of the cores 90 can be positioned with respect to the forming die based on the outer circumference surface of the core plate 62.

Figure 6:
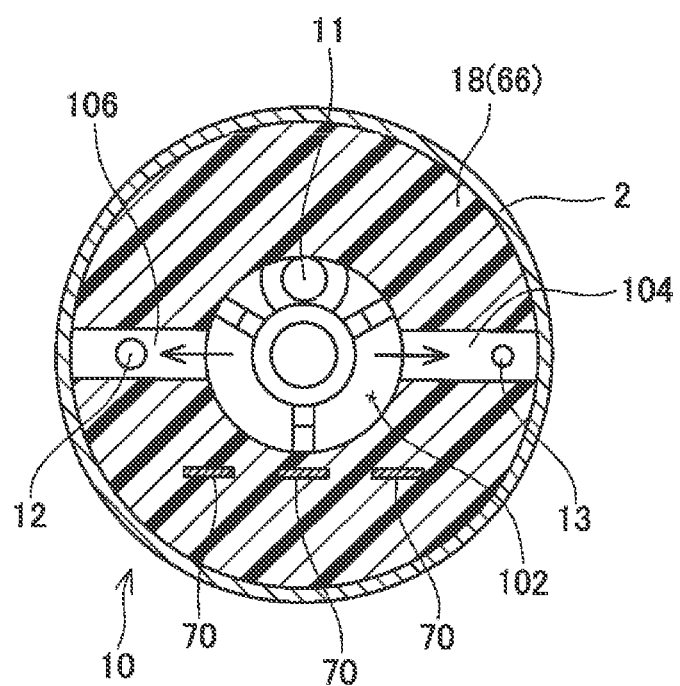
FIG. 6 is an end section view taken along line VI-VI in FIG. 4.

As shown in FIGS. 4 to 6, the fuel chamber 102, and a first branch fuel path 104 and a second branch fuel path 106 both connected to the fuel chamber 102 are formed between the upper body 18 and the motor section 50. The fuel chamber 102 is positioned in the center of a cross section orthogonal to the axial line of the fuel pump 10 (that is, the cross section shown in FIG. 5 or 6). The fuel chamber 102 is in communication with the gap between the rotor 54 and the stator 60 and with the fuel path 100. Thus, fuel flowing from the pump section 30 through the motor section 50 toward the upper body 18 enters the fuel chamber 102. As shown in FIGS. 5 and 6, the discharge port 11 is connected to the fuel chamber 102. Thus, the fuel in the fuel chamber 102 is fed directly to the discharge port 11.

As shown in FIGS. 4 and 6, the first branch fuel path 104 extends from the fuel chamber 102 in a radial direction of the fuel pump 10 (that is, in a direction perpendicular to the axial line of the fuel pump 10). One end of the first branch fuel path 104 is connected to the fuel chamber 102, and the other end of the first branch fuel path 104 reaches the housing 2. As shown in FIG. 4, the first branch fuel path 104 includes a reduction portion 105 formed at a fuel chamber 102 side end thereof. The reduction portion 105 has a cross sectional area (the area of a cross section of the reduction portion 105 which is orthogonal to the direction in which the first branch fuel path 104 extends) smaller than a cross sectional area of the remaining portion of the first branch fuel path 104. Furthermore, the remaining portion of the first branch fuel path 104 has a smaller cross sectional area than that of the discharge port 11. The supply port 13 is connected to the first branch fuel path 104. The supply port 13 is connected to the first branch fuel path 104 at a position which is closer to the Outer circumference than a position where the reduction portion 105 is formed. Therefore, the reduction portion 105 is positioned between the fuel chamber 102 side end of the first branch fuel path 104 and the opening portion of the first branch fuel path 104 opened to the supply port 13. Thus, fuel having passed through the reduction portion 105 is fed to the supply port 13.

The second branch fuel path 106 is configured substantially similarly to the first branch fuel path 104. Specifically, the second branch fuel path 106 extends from the fuel chamber 102 in the radial direction of the fuel pump 10 and in a direction opposite to the direction in which the first branch fuel path 104 extends, as shown in FIGS. 4 and 6. That is, the direction in which the first branch fuel path 104 extends is different, by 180 degrees, from the direction in which the second branch fuel path 106 extends. As shown in FIG. 6, the first branch fuel path 104 and the second branch fuel path 106 extend in the directions which are orthogonal to the reference line connecting the axial line of the fuel pump 10 and the discharge port 11 together. Thus, the first branch fuel path 104 and the second branch fuel path 106 are line-symmetric with respect to the reference line connecting the axial line of the fuel pump 10 and the discharge port 11 together. One end of the second branch fuel path 106 is connected to the fuel chamber 102, and the other end of the second branch fuel path 106 reaches the housing 2. As shown in FIG. 4, the second branch fuel path 106 also includes a reduction portion 107 formed at a fuel chamber 102 side end thereof. The reduction portion 107 has a cross sectional area (the area of a cross section of the reduction portion 107 which is orthogonal to the direction in which the second branch fuel path 106 extends) smaller than a cross sectional area of the remaining portion of the second branch fuel path 106. Furthermore, the remaining portion of the second branch fuel path 106 has a smaller cross sectional area than the discharge port 11. The relief port 12 is connected to the second branch fuel path 106. The relief port 12 is connected to the second branch fuel path 106 at a position which is closer to the outer circumference than a position where the reduction portion 107 is formed. Therefore, the reduction portion 107 is positioned between the fuel chamber 102 side end of the second branch fuel path 106 and the opening portion of the second branch fuel path 106 opened to the relief port 12. Thus, fuel having passed through the reduction portion 107 is fed to the relief port 12.

Figure 7:
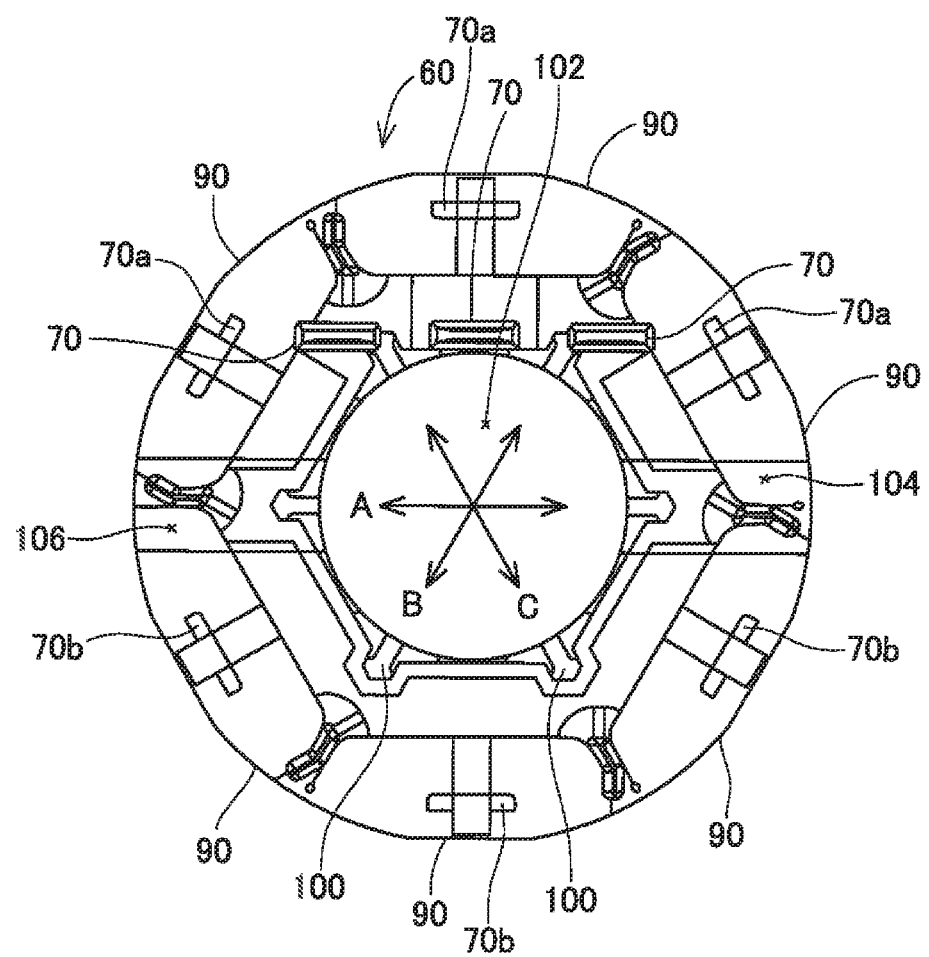
FIG. 7 is a diagram schematically showing positional relations between a branch fuel path and a stator.

As shown in FIG. 7, each of the first branch fuel path 104 and the second branch fuel path 106 is formed at a position between the adjacent terminals 70. Specifically, each of the first branch fuel path 104 and the second branch fuel path 106 is formed at a position between a coil weld terminal 70a connected to the terminal 70, which receives a supplied voltage, and a coil weld terminal 70b forming a neutral point. This allows the first branch fuel path 104 and the second branch fuel path 106 to be disposed in a limited space between the upper body 18 and the motor section 50, enabling a reduction in the overall height of the fuel pump 10. The positions where the first branch fuel path and the second branch fuel path are formed are not limited to a direction A but may be placed in a direction B or C. Moreover, one of the first branch fuel path and the second branch fuel path may be formed in a direction A, B, or C, whereas the other of the first branch fuel path and the second branch fuel path may be formed in a direction (A, B, or C) different from the direction in which the one of the first branch fuel path and the second branch fuel path is formed.

Now, operation of the fuel pump 10 will be described. When power from the external power source is supplied to the fuel pump 10 via the terminals 70, the rotor 54 rotates. As a result, the impeller 34 rotates to suck fuel from the fuel tank into the pump section 30 through the inlet port 38. The fuel sucked into the pump section 30 has the pressure thereof raised by the pump section 30, and the resultant fuel flows into the motor section 50. The fuel having flowed into the motor section 50 passes through the gap between the rotor 54 and the stator 60 and through the fuel path 100 into the fuel chamber 102. The fuel having flowed into the fuel chamber 102 is partly discharged into the engine through the discharge port 11. Furthermore, the remaining part of the fuel having flowed into the fuel chamber 102 passes through the first branch fuel path 104 to the supply port 13 and through the second branch fuel path 106 to the relief port 12.

In the fuel pump 10, the discharge port 11 is connected to the fuel chamber 102, the supply port 13 is connected to the first branch fuel path 104, and the relief port 12 is connected to the second branch fuel path 106. Thus, even if pressure pulsation occurs in the fuel flowing out through the supply port 13 or the relief port 12, the pressure pulsation can be restrained from affecting the fuel discharged through the discharge port 11. In particular, the discharge port 11 has a larger area than the first branch fuel path 104 and the second branch fuel path 106. Moreover, the first branch fuel path 104 includes the reduction portion 105 formed at the fuel chamber 102 side end thereof, and the second branch fuel path 106 includes the reduction portion 107 formed at the fuel chamber 102 side end thereof. These arrangements can restrain possible pressure pulsation in the fuel flowing out through the supply port 13 or the relief port 12 from affecting the fuel discharged through the discharge port 11. As a result, possible vibration of fuel piping can be suppressed, and fuel can be stably fed to the engine through the discharge port 11.

Furthermore, the first branch fuel path 104 and the second branch fuel path 106 extend from the fuel chamber 102 in the radial direction of the fuel pump 10 (i.e., the direction perpendicular to the axial line of the fuel pump 10). On the other hand, the direction in which the fuel flows from the fuel chamber 102 to the discharge port 11 is parallel to the axial line of the fuel pump 10. Thus, the flow of the fuel to the first branch fuel path 104 and the second branch fuel path 106 is restrained from affecting the flow of the fuel discharged through the discharge port 11, allowing the fuel to be smoothly discharged through the discharge port 11.

Moreover, in the motor section 50, the fuel flows only inside the stator 60 (specifically, through the gap between the rotor 54 and the stator 60 and through the fuel path 100) and does not flow outside the stator 60 (that is, between the stator 60 and the housing 2). Thus, the fuel flows into the fuel chamber 102 only through the gap between the rotor 54 and the stator 60 and through the fuel path 100. The fuel flows into the first branch fuel path 104 and the second branch fuel path 106 only from the fuel chamber 102. Therefore, the fuel flows out smoothly through the discharge port 11 and can be allowed to flow out smoothly through the supply port 13 and the relief port 12. As a result, the pumping efficiency of the fuel pump 10 can be increased.

The present embodiments are described above in detail, but these examples are merely illustrative and place no limitation on the scope of the patent claims. The technology described in the patent claims also encompasses various changes and modifications to the specific examples described above.

Figure 8:
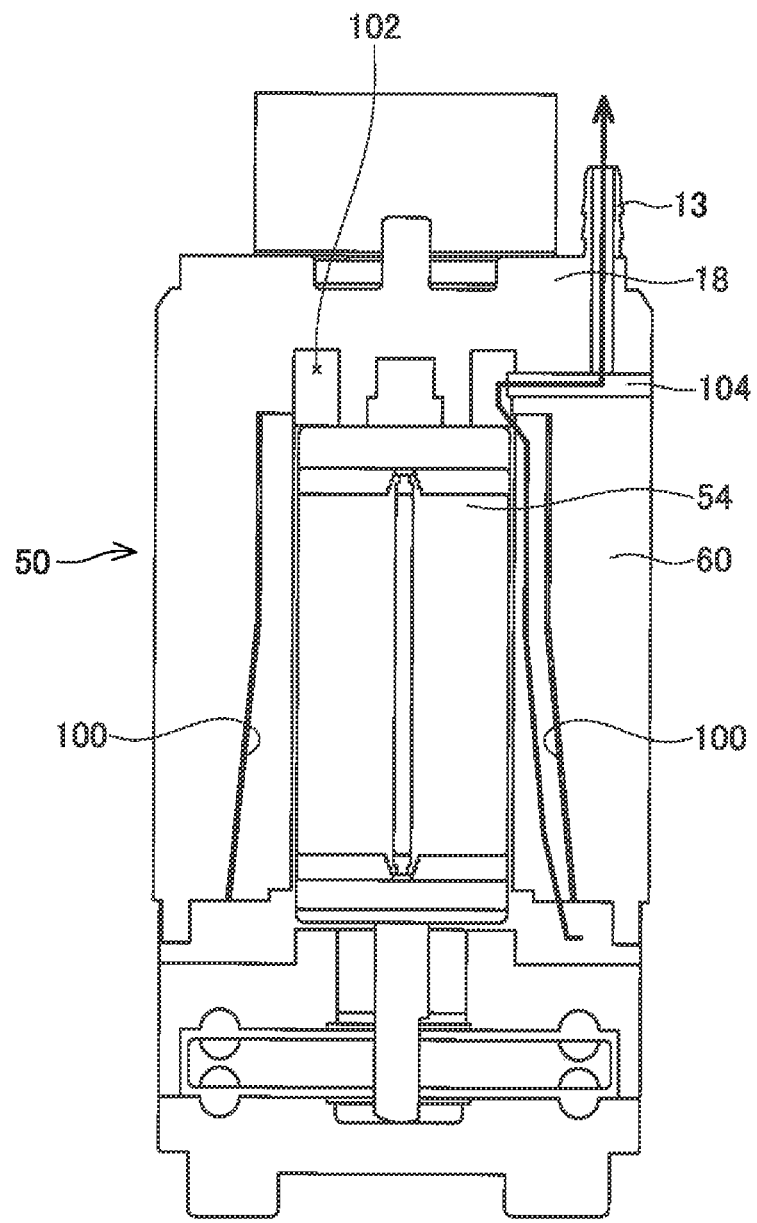
FIG. 8 is a diagram showing how fuel flows in a fuel pump according to a variation (the diagram corresponds to the cross section shown in FIG. 4).
Figure 9:
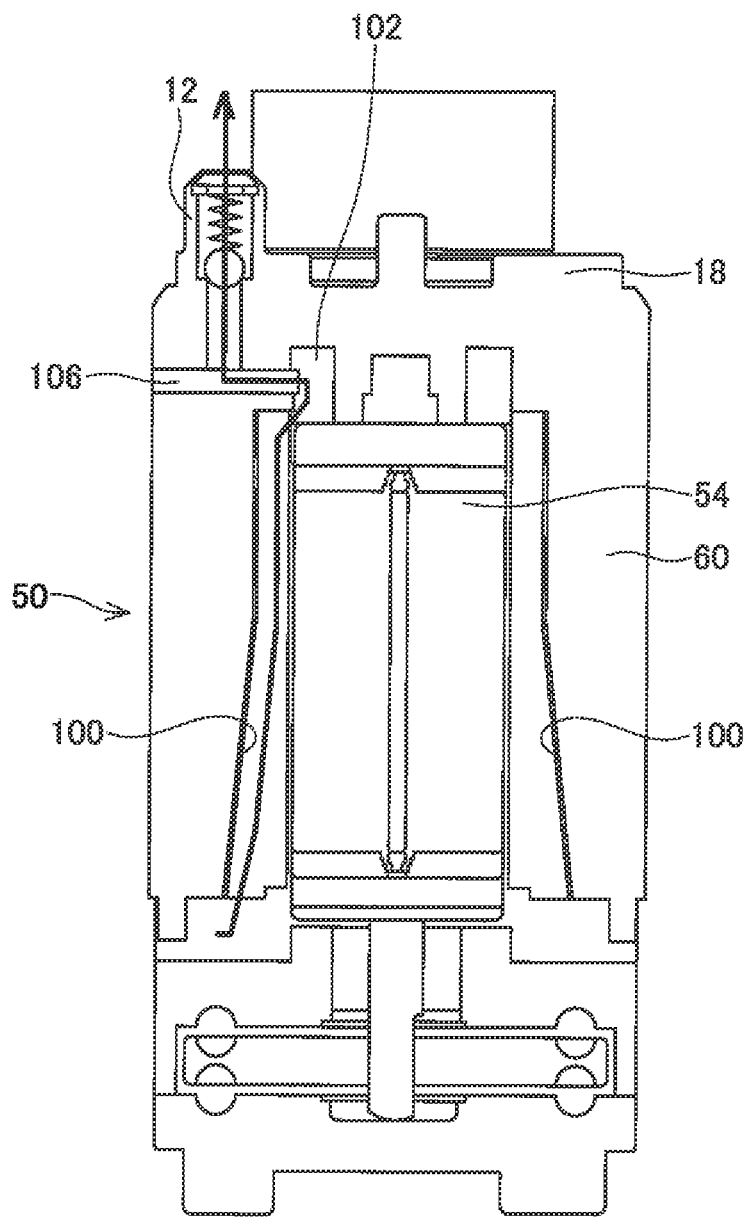
FIG. 9 is a diagram showing how fuel flows in a fuel pump according to another variation (the diagram corresponds to the cross section shown in FIG. 4).

(1) In the above-described embodiment, the discharge port 11, the supply port 13, and the relief port 12 are all provided on the upper surface of the fuel pump 10. However, the embodiment of the present teachings is not limited to such an example. For example, exclusively the discharge port 11 and the supply port 13 may be provided on the upper surface of the fuel pump 10 as shown in FIG. 8, or exclusively the discharge port 11 and the relief port 12 may be provided on the upper surface of the fuel pump 10 as shown in FIG. 9. Even in such a configuration, when the fuel chamber 102 and the branch fuel path 104 or 106 are formed between the upper body 18 and the motor section 50, possible pressure pulsation in the fuel discharged through the discharge port 11 can be suppressed to allow the fuel to be stably supplied to the engine.

(2) In the above-described embodiment, the reduction portions 105 and 107 are formed by projecting lower wall surfaces of the branch fuel paths 104 and 106 upward, respectively (see FIG. 4). However, the embodiment of the present teachings is not limited to such an example. For example, the reduction portion may be formed by projecting an upper wall surface of each of the branch fuel paths 104 and 106 downward. Alternatively, the reduction portion may be formed by projecting one of the opposite side surfaces of each of the branch fuel paths 104 and 106 toward the other side surface.

(3) In the above-described embodiment, the resin layer 66a of the stator 60 and the upper body 18 are integrated together. However, the resin layer of the stator and the upper body may be separated from each other instead of being integrated together.

Finally, although the preferred representative embodiments have been described in detail, the present embodiments are for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

Further, it is to be understood that the technical elements described in the present specification and the drawings exhibit technical usefulness solely or in various combinations thereof and shall not be limited to the combinations described in the claims at the time of filing. Furthermore, the techniques illustrated in the present specification and the drawings are to achieve a plurality of objectives at the same time, whereby technical usefulness is exhibited by attaining any one of such objectives.

What is claimed is:

1. A fuel pump comprising:
   a housing including an inlet port disposed on a first side of the housing;
   a pump section disposed within the housing on the first side, the pump section communicating with the inlet port;
   a motor section disposed within the housing on a second side and communicating with the pump section, the motor section including a brushless motor configured to drive the pump section; and
   an upper body closing an end of the housing on the second side, the upper body including a discharge port communicating with the motor section and an outlet port communicating with the motor section, wherein
   the brushless motor comprises a rotor and a stator, said stator including a resin layer disposed along an outer circumference surface of the rotor, the resin layer and the upper body being integrated together,
   a fuel chamber, into which fuel flows from the pump section, and a first branch fuel path, which is connected to the fuel chamber, are provided within the upper body,
   the discharge port is connected to the fuel chamber, the fuel in the fuel chamber being directly provided to the discharge port without being provided through the first branch fuel path,
   the fuel in the pump section is provided to the first branch fuel path only through the fuel chamber, and
   the outlet port is connected to the first branch fuel path, the fuel in the fuel chamber being provided to the outlet port by being provided through the first branch fuel path,
   the first branch fuel path extends in a radial direction of the fuel pump,
   the first branch fuel path has a reduction portion of which a cross sectional area is smaller than that of an other portion of the first branch fuel path; and
   the reduction portion extends in the radial direction and is located in a portion of the first branch fuel path extending in the radial direction of the fuel pump.

2. The fuel pump as in claim 1, the fuel from the fuel chamber to the discharge port flows in a second direction which is not parallel to the radial direction.

3. The fuel pump as in claim 2, wherein the second direction is parallel to an axial direction of the fuel pump.

4. The fuel pump as in claim 1, wherein
   one end of the first branch fuel path is connected to the fuel chamber,
   the reduction portion is disposed between the one end of the first branch fuel path and an opening portion opened to the outlet port, and
   a position of the opening portion is closer to the outer circumference than that of the reduction portion.

5. The fuel pump as in claim 1, wherein
   the upper body further includes a relief port communicating with the motor section,
   a relief valve is provided at the relief port, the relief valve being configured to open the relief port when pressure of the fuel from the pump section exceeds a predetermined value,
   a second branch fuel path connected to the fuel chamber is provided within the upper body, and
   the relief port is connected to the second branch fuel path, the fuel in the fuel chamber being provided to the relief port by being provided through the second branch fuel path.

6. The fuel pump as in claim 5, wherein, in a planar view of the upper body,
   a supply port is disposed on one side of a reference line,
   the relief port is disposed on the other side of the reference line, and
   the reference line is a line connecting an axial line of the motor section and the discharge port.

7. The fuel pump as in claim 1, wherein
   no fuel path is provided between the housing and an outer circumference surface of the stator, and
   a fuel path is provided between the rotor and the stator, the fuel path being configured to supply the fuel from the pump section to the fuel chamber, and
   one end of the fuel path is connected to the fuel chamber and opens toward a center of the fuel pump.

8. A fuel pump comprising:
   a housing including an inlet port disposed on a first side of the housing;
   a pump section disposed within the housing on the first side, the pump section communicating with the inlet port;
   a motor section disposed within the housing on a second side and communicating with the pump section, the motor section including a brushless motor configured to drive the pump section;
   an upper body closing an end of the housing on the second side, the upper body including a discharge port communicating with the motor section and a relief port communicating with the motor section; and a relief valve provided at the relief port, the relief valve being configured to open the relief port when pressure of the fuel from the pump section exceeds a predetermined value, wherein the brushless motor comprises a rotor and a stator, said stator including a resin layer disposed along an outer circumference surface of the rotor, the resin layer and the upper body being integrated together, a fuel chamber, into which fuel flows from the pump section, and a branch fuel path, which is connected to the fuel chamber, are provided within the upper body, the discharge port is connected to the fuel chamber, the fuel in the fuel chamber being directly provided to the discharge port without being provided through the branch fuel path, the fuel in the pump section is provided to the branch fuel path only through the fuel chamber, and the relief port is connected to the branch fuel path, the fuel in the fuel chamber being provided to the relief port by being provided through the branch fuel path, and the branch fuel path extends in a radial direction of the fuel pump, the branch fuel path has a reduction portion of which a cross sectional area is smaller than that of an other portion of the branch fuel path; and the reduction portion extends in the radial direction and is located in a portion of the first branch fuel path extending in the radial direction of the fuel pump.

9. A fuel pump comprising:

a housing including an inlet port disposed on a first side of the housing;

a pump section disposed within the housing on the first side, the pump section communicating with the inlet port;

a motor section disposed within the housing on a second side and communicating with the pump section, the motor section including a brushless motor configured to drive the pump section; and an upper body closing an end of the housing on the second side, the upper body including a discharge port communicating with the motor section and an outlet port communicating with the motor section, wherein the brushless motor comprises a rotor, and a stator, the stator including a resin layer disposed along an outer circumference surface of the rotor, the resin layer and the upper body being integrated together, a fuel chamber, into which fuel flows from the pump section, and a first branch fuel path, which is connected to the fuel chamber, are provided within the upper body, the discharge port is connected to the fuel chamber, the fuel in the fuel chamber being directly provided to the discharge port without being provided through the first branch fuel path, the fuel in the pump section is provided to the first branch fuel path only through the fuel chamber, the outlet port is connected to the first branch fuel path, the fuel in the fuel chamber being provided to the outlet port by being provided through the first branch fuel path, the upper body further includes a relief port communicating with the motor section, a relief valve is provided at the relief port, the relief valve being configured to open the relief port when pressure of the fuel from the pump section exceeds a predetermined value, a second branch fuel path connected to the fuel chamber is provided within the upper body, and the relief port is connected to the second branch fuel path, the fuel in the fuel chamber being provided to the relief port by being provided through the second branch fuel path.

* * * * *